United States Patent [19]

Argurio et al.

[11] 4,053,540
[45] Oct. 11, 1977

[54] SELF-SEALING FILMS

[75] Inventors: Federico Argurio, Brussels; Mario Borsatti, Overijse; Jan Heindrijckx, Berg, all of Belgium

[73] Assignee: Exxon Research & Engineering Co., Linden, N.J.

[21] Appl. No.: 714,894

[22] Filed: Aug. 16, 1976

Related U.S. Application Data

[63] Continuation of Ser. No. 585,882, June 11, 1975, abandoned.

[30] Foreign Application Priority Data

July 5, 1974 United Kingdom ............... 29970/74

[51] Int. Cl.$^2$ .............................................. C08K 5/11
[52] U.S. Cl. ............................... 260/897 B; 260/31.6; 526/5
[58] Field of Search ......... 526/5; 260/23 H, 28.5 AV, 260/31.6, 897 B

[56] References Cited

U.S. PATENT DOCUMENTS

| | | | |
|---|---|---|---|
| 3,048,263 | 8/1962 | Sacks | 260/23 H |
| 3,048,266 | 8/1962 | Hackhel | 260/31.6 |
| 3,177,174 | 4/1965 | Tirpak | 260/31.6 |
| 3,498,962 | 3/1970 | Bruno | 260/87.3 |
| 3,541,040 | 11/1970 | Eastes | 260/31.6 |
| 3,574,156 | 4/1971 | Wagner | 260/23 H |
| 3,652,473 | 3/1972 | Quinn | 260/23 H |
| 3,663,663 | 5/1972 | McAda | 260/897 B |

*Primary Examiner*—Paul R. Michl
*Attorney, Agent, or Firm*—John J. Mahon

[57] ABSTRACT

A composition suitable for fabricating into a self-sealing film comprises:
i. 95.0 to 99.9 wt.% of either a copolymer of ethylene and vinyl acetate, said copolymer containing 0.10 to 1.95 wt.% of the vinyl acetate, or 95.0 to 99.9 wt.% of a mixture of a thermoplastic polyolefin and a copolymer of ethylene and vinyl acetate, the proportion of polymerized vinyl acetate in the mixture being from 0.10 to 1.95 wt.% and
ii. 0.01 to 5.0 wt.% of a partial ester of a carboxylic acid and a polyol, e.g. sorbitan monolaurate.

The film can be made for example by tubular blowing.

3 Claims, No Drawings

SELF-SEALING FILMS

This is a continuation of application Ser. No. 585,882, filed June 11, 1975, now abandoned.

This invention relates to self-sealing packaging films.

Self-sealing packaging films are known and are used in shops for example, for wrapping and display of food in refrigerated display units.

Various materials have been used for such films, the most common being PVC and polyolefin. However these films suffer from various disadvantages and have not been completely satisfactory in use; for example they are too sticky and have poor antifog properties.

We have now discovered a composition which when made into film has good antifog properties, good permeability to oxygen to preserve the quality of the packaged food, and has optimum tack. The film also has relatively low cost compared with other films. According to this invention a composition suitable for fabricating into a self-sealing film comprises (i) 95.0 to 99.9 wt.% of either a copolymer of ethylene and a vinyl (or hydrocarbyl substituted vinyl) ester of a $C_1$—$C_{30}$ monocarboxylic acid, said copolymer contaning 0.10 to 1.95 wt.% of the vinyl (or hydrocarbyl substituted vinyl) ester, or 95.0 to 99.9 wt.% of a mixture of a thermoplastic polyolefin and a copolymer of ethylene and a vinyl (or hydrocarbyl substituted vinyl) ester of a $C_1$—$C_{30}$ monocarboxylic acid, the proportion of polymerized vinyl (or hydrocarbyl substituted vinyl) ester in the mixture being from 0.10 to 1.95 wt.% and (ii) 0.01 to 5.0 wt.% of a partial ester of a carboxylic acid and a polyol.

Concerning the ethylene copolymer the carboxylic acid is preferably aliphatic, and saturated and preferably mono carboxylic. Thus one may use vinyl propionate, vinyl hexoate, vinyl octanoate, vinyl dodecanoate, vinyl behenate, or ispropenyl acetate. The particularly preferred ester is vinyl acetate.

One method of preparing the copolymer involves feeding the monomers into a tubular reactor which has been previously purged with nitrogen. A small amount of oxygen, usually 0.005 to 0.05 wt.% based on the weight of ethylene is also introduced into the reactor. Alternatively a peroxide initiator, e.g. di-t-butyl peroxide, or a mixture of peroxide initiator and oxygen may be introduced into the reactor in place of oxygen alone. A solvent (e.g. benzene, water, saturated hydrocarbons, methanol) may also be employed in the reaction. The pressure is maintained between 60 and 2,700 atmospheres (900 and 40,000 p.s.i.g.) preferably between 135 and 2,000 atmospheres (2,000 and 30,000 p.s.i.g.). The temperature should be maintained between 40° C and 300° C, preferably between 70° C and 250° C.

Another method of preparing the copolymers is via a batch process. Such a process requires a solvent for the reactants, the solvent being for example toluene or hexane. The preferred solvent however is benzene. The reaction initiator may be any peroxy compound, preferably di-t-butyl peroxide. The temperature of the polymerization reaction is dependent upon the particular peroxide initiator employed and should be high enough for sufficient decomposition of the initiator to occur. This temperature will usually be between 40° C and 300° C.

For the preferred initiator, i.e. di-tert-butyl peroxide, the most suitable temperature is between 130° and 160° C. The pressure should be between 60 and 1,000 atmospheres (900 and 15,000 p.s.i.g.), and preferably being between 75 and 470 atmospheres (1,100 and 7,000 p.s.i.g.). The autoclave or similar equipment containing the solvent, initiator and vinyl or hydrocarbyl substituted vinyl ester is purged with nitrogen and then with ethylene before charging with a sufficient amount of ethylene to yield the desired pressure when heated to the reaction temperature. During the polymerization additional ethylene is added to maintain the pressure at the desired level. Further amounts of initiator and/or solvent, and/or vinyl and hydrocarbyl substituted vinyl ester may also be added during the reaction. On completion of the reaction free solvent and unreacted monomers are removed by stripping or some other suitable process yielding the desired polymer.

The ethylene copolymer should have a molecular weight corresponding to a melt index (as defined in ISO.R292) of 0.2 to 20, preferably 0.5 to 10.

If the copolymer of ethylene and vinyl (or hydrocarbyl substituted vinyl) ester is used along as component (i) the proportion of polymerized ester must be from 0.10 to 1.95 wt.% and it is preferably 1.50 to 1.90 wt.%, e.g. about 1.8 wt.%.

If this copolymer is used in conjection with the thermoplastic polyolefin the proportion of vinyl (or hydrocarbyl substituted vinyl) ester in the copolymer can vary over much wider limits, and the overall proportion of polymerized ester in the mixture is adjusted to being between 0.10 and 1.95 wt.% by suitably selection of the amount of copolymer and thermoplastic polyolefin in the mixture. In such cases it is possible to use copolymers containing a much higher proportion of ester, for example a copolymer of ethylene and vinyl acetate containing 20 to 50, suitably 30 to 40 wt.% of polymerized vinyl acetate. Alternatively one could use a copolymer having rather less ester, e.g. a copolymer of ethylene and vinyl acetate containing 3 to 10 wt.% of polymerized vinyl acetate.

The thermoplastic polyolefin which can be used in conjunction with the copolymer is preferably a homopolymer of ethylene but it can be a homopolymer of other olefins e.g. propylene, butylene, or it can be a copolymer, e.g. a copolymer of ethylene and propylene.

Examples of suitable polyolefins include low density polyethylene (preferably 0.920 to 0.924 e.g. 0.922) which is usually prepared by polymerizing ethylene at high pressure, e.g. 30 to 2,500 atmospheres, in the presence of a polymerization catalyst, e.g. an organic peroxide such a lauroyl peroxide. Also suitable is low pressure high density polyethylene which usually has a density of 0.94 to 0.96, and a molecular weight of from 30,000 to 500,000 as determined by the intrinsic viscosity method. This low pressure polyethylene can be made by well-known polymerization methods using a Zieger catalyst (e.g. $AlCl_3$ and $TiCl_4$). Another suitable polyolefin is low pressure isotactic polypropylene polymer which usually has a density of from 0.86 to 0.91, and a molecular weight of from 50,000 to 500,000 as determined by the intrinsic viscosity method. It is made by similar methods to those used for making low pressure polyethylene. Also suitable are medium density polyethylene (0.926 to 0.940 e.g. about 0.934) and thermoplastic copolymer with partially cystalline heteroblocks of propylene with ethylene and/or butene with a density of from 0.896 to 0.899.

When using a mixture of the copolymer of ethylene and vinyl (or hydrocarbyl substituted vinyl) ester and thermoplastic polyolefin and relative proportions of the copolymer and thermoplastic polyolefin can vary considerably but usually the amounts vary from 20 to 60 wt.% of copolymer and 40 to 80 wt.% of thermoplastic polyolefin, in particular from 30 to 50 wt.% and 50 and 70 wt.% respectively.

The second component of the film-forming composition of this invention is a partial ester of a caboxylic acid and polyol, by which term we mean that there is at least one free hydroxyl group remaining unesterified, this hydroxyl group being derived originally from the polyol. The carboxylic acid can be saturated or unsaturated carboxylic acid and the preferred acids have 10 to 24 carbon atoms per molecule. Preferably the carboxylic acid is a (monobasic) fatty acid and suitable acids include the saturated acids lauric ($C_{12}$), myristic ($C_{14}$), palmitic ($C_{16}$), stearic ($C_{18}$) or behenic ($C_{22}$) or the unsaturated acids oleic ($C_{18}$), ricinoleic ($C_{18}$) or erucic ($C_{22}$). If desired however one could use a dicarboxylic acid, e.g. adipic or pimelic acids.

The polyol may have two hydroxyl groups per molecule, e.g. ethylene glycol, propylene gylcol or butylene glycol; three hydroxyl groups per molecule, e.g. glycerol or trimethylol propane or four hydroxyl groups per molecule, e.g. pentaerythritol. Further examples are sorbitol (6 hydroxyl groups), sorbitan (sorbitol anhydride - 4 hydroxyl groups), and dipentaerythritol (6 hydroxyl groups). Since the ester must be a partial ester at least one of the hydroxyl groups nust not be esterified. Thus, preferred esters are mono esters or sorbitol or sorbitan, e.g. sorbitan mono laurate, sorbitan monostearate or sorbitan monobehenate, but one could use for example glyceryl monooleate.

The preferred amount of partial ester is 1 to 3 wt.% e.g. about 1.5 wt.%.

After mixing the constituents of the composition of the invention the desired stretch and seal film can be made either by tubular blowing or by chill roll casting. In the tubular blowing method the composition in the molten state is forced around a mandrel inside a die and extruded e.g. at a temperature between 150° C and 250° C through the die opening as a tube. The tube whilst still in the melt state is expanded to a hollow cylinder of desired diameter by blowing with air admitted through the centre of the mandrel. As an alternative to cooling with air the extruded film can be cooled by a water bath system in which the extruded film (tubular or flat) is cooled by passing through a water bath containing flowing water. In the chill roll casting method the hot melt extruded through a die slot is cooled by the surface of two or more watercooled chill rolls. The chill roll casting method and the water bath system result in a more tacky, more elastic film with better visual appearance.

The thickness of the film is typically from 8 to 30 micron, preferably 10 to 25 micron, e.g. 12 to 20 micron.

The films produced from the composition of this invention have the following advantages:

Optimum Tack resulting in both self adhesion and easiness in film handling and machinability whereby the efficiency of the packaging operation is increased;

Optimum Antifog Properties whereby the packaged product can be cearly seen in the display unit since no layer of opaque fine droplets is formed when the product is placed in a refrigerator;

Good permeability to oxygen whereby the quality of any food which is packaged is preserved; and Roll wind-off whereby during use or further processing operations, such as slitting and re-winding of large rolls, the film can be unwound easily from the roll.

Example

The following compounds were mixed together in the given proportions:

| | | |
|---|---|---|
| Homopolymer of ethylene having a number average MW of about 20,000 and a density of 0.922 | 62.5 wt. % | polymerized vinyl acetate content = 1.83 wt. % |
| Ethylene - vinyl acetate Copolymer containing 5 wt. % vinyl acetate | 36.0 wt. % | |
| Sorbitan monolaurate | 1.5 wt. % | |

The mixture was melted and then extruded by the tubular blowing method — melt temperature 230° C. A blown film of 15 microns thickness was obtained. The properties of this film were compared with 3 other types of film with the following results:

| Film | Tack | Antifog | Wind-Off | Machinability |
|---|---|---|---|---|
| Present Invention | Excellent | Excellent | Excellent | Excellent |
| A | Excellent | Poor | Good | Good |
| B | Excellent | Poor | Fair | Poor |
| C | Excellent | Good | Poor | Fair |

Film A was a film of 15 microns thickness made from a blend containing 96.65 wt.% ethylene — vinyl acetate copolymer having a 5 wt.% vinyl acetate content, 3.00 wt.% of a petroleum resin and 0.35 wt.% sorbitan monolaurate.

Film B was a commercial PVC film of 15 microns thickness.

Film C was a film of 15 microns thickness made from a blend containing 97.0 wt.% of ethylene — vinyl acetate copolymer having a 7.0 wt.% vinyl acetate content and 3.0 wt.% of glyceryl monolaurate. Thus, it can be seen that films made from the composition of the invention have clear advantages over previously known films.

What is claimed is:

1. A composition suitable for fabricating into a self-sealing film consisting essentially of
   i. 95.0 to 99.9 wt. % of a mixture of thermoplastic polyethylene and a copolymer of ethylene and vinyl acetate, the copolymer containing 3 to 10 wt. % of polymerized vinyl acetate, the proportion of polymerized vinyl acetate in the mixture being from 0.10 to 1.95 wt. %; and
   ii. 0.01 to 5.0 wt. % of a partial ester, the partial ester being gylcerol monooleate or a monoester of sorbitol or sorbitan and a $C_{10}$ to $C_{24}$ carboxylic acid.

2. A composition according to claim 1 wherein the partial ester is sorbitan monolaurate.

3. A composition according to claim 2 wherein the amount of partial ester is 1 to 3 wt.%.

* * * * *